United States Patent
Wang

(10) Patent No.: US 11,770,814 B2
(45) Date of Patent: Sep. 26, 2023

(54) ANTENNA ADJUSTMENT METHOD AND APPARATUS, GATEWAY, TERMINAL, ADJUSTMENT SYSTEM, AND STORAGE MEDIUM

(71) Applicant: BEIJING XIAOMI MOBILE SOFTWARE CO., LTD., Beijing (CN)

(72) Inventor: Peng Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 140 days.

(21) Appl. No.: 17/385,741

(22) Filed: Jul. 26, 2021

(65) Prior Publication Data

US 2022/0295467 A1 Sep. 15, 2022

(30) Foreign Application Priority Data

Mar. 11, 2021 (CN) .......................... 202110265334.1

(51) Int. Cl.
*H04W 72/044* (2023.01)
*H04W 72/1263* (2023.01)
*G01S 5/12* (2006.01)
*H04B 1/7163* (2011.01)
(Continued)

(52) U.S. Cl.
CPC ............. *H04W 72/046* (2013.01); *G01S 5/12* (2013.01); *H04B 1/7163* (2013.01); *H04W 16/28* (2013.01); *H04W 72/1263* (2013.01); *H04W 72/51* (2023.01); *H04B 2201/71634* (2013.01)

(58) Field of Classification Search
CPC .............................. H04W 64/00; H04W 64/03
See application file for complete search history.

(56) References Cited

U.S. PATENT DOCUMENTS

2010/0277284 A1* 11/2010 Brown ................. G06K 7/0008
340/10.3
2015/0148059 A1* 5/2015 Puthenpura ........... H04W 64/00
455/456.1
2020/0205104 A1 6/2020 Akkarakaran
(Continued)

FOREIGN PATENT DOCUMENTS

CN 110176672 A 8/2019
CN 111505570 A 8/2020
(Continued)

OTHER PUBLICATIONS

First Office Action of the Chinese Application No. 202110265334.1, dated Apr. 27, 2022, with English translation (17p).
(Continued)

*Primary Examiner* — Kevin Kim
(74) *Attorney, Agent, or Firm* — Arch & Lake LLP

(57) ABSTRACT

A method and apparatus, a gateway, a terminal, an adjustment system, and a storage medium are provided. The method may be applied to a gateway. The gateway may determine position information of at least one terminal through at least three ultra-wide band modules. The at least one terminal may be within a network coverage range of a gateway. The gateway may include the at least three ultra-wide band modules. The gateway may adjust a lobe direction of an antenna based on the position information of the at least one terminal to achieve shaped beam coverage for each terminal.

14 Claims, 8 Drawing Sheets

At least two hyperbolic curves are determined through at least three ultra-wide band modules — S101a1

Intersection position information of an intersection of the at least two hyperbolic curves is taken as position information of a terminal — S101a2

A lobe direction of an antenna is adjusted based on the position information of the at least one terminal to realize shaped beam coverage for each terminal — S102

(51) Int. Cl.
*H04W 16/28* (2009.01)
*H04W 72/51* (2023.01)

(56) References Cited

U.S. PATENT DOCUMENTS

2020/0235800 A1 7/2020 Tang et al.
2022/0182116 A1* 6/2022 Raghavan ............... G01S 19/21

FOREIGN PATENT DOCUMENTS

CN 112261669 A 1/2021
JP 2020155894 A * 9/2020

OTHER PUBLICATIONS

Kakubari Yasuyuki et al: "MMW mobile terminal positioning using remote receivers", 2017 IEEE Conference On Antenna Measurements & Applications (CAMA), IEEE, Dec. 4, 2017(Dec. 4, 2017), pp. 341-344, XP033308767, DOI: 10.1109/CAMA.2017.8273445 [retrieved on Jan. 29, 2018], the whole document, (4 pages).
Bjornson Emil et al: "Optimal Multiuser Transmit Beamforming: A Difficult Problem with a Simple solution Structure [Lecture Notes]", IEEE Signal Processing Magazine, IEEE, USA, vol. 31, No. 4, Jul. 1, 2014 (Jul. 1, 2014), pp. 142-148, XP011551025, ISSN: 1053-5888, DOI: 10.1109/MSP. 2014.2312183 [retrieved on Jun. 12, 2014], the whole document, (7 pages).
European Search Report in the European application No. 21187156. 1, dated Jan. 28, 2022, (10 pages).

* cited by examiner

ANTENNA ADJUSTMENT METHOD AND APPARATUS, GATEWAY, TERMINAL, ADJUSTMENT SYSTEM, AND STORAGE MEDIUM

CROSS-REFERENCE TO RELATED APPLICATION

This application is based upon and claims priority to Chinese Patent Application No. 202110265334.1, filed on Mar. 11, 2021, the entire content of which is incorporated herein by reference for all purposes.

TECHNICAL FIELD

The disclosure relates to the technical field of information processing, and more particularly, to an antenna adjustment method and apparatus, a gateway, a terminal, an adjustment system, and a storage medium.

BACKGROUND

In a smart antenna system, a lobe direction of an antenna is adjusted to realize distribution of dynamic optimization resources of an antenna. In existing implementations, a direction of arrival of an incident signal is usually determined based on a mathematical algorithm for spatial spectrum estimation, such as a multiple signal classification (MUSIC) algorithm, an estimation of signal parameters via rotational invariance techniques (ESPRIT) algorithm, and a maximum likelihood method and the like, and then the lobe direction of the antenna is adjusted based on the direction of arrival of the incident signal. However, the mathematical algorithm for spatial spectrum estimation has harsh conditions and complex calculations. In addition, the existing implementations need to establish communication before adjusting a lobe of an antenna, and there is a problem of a single adjustment method for the lobe of the antenna.

SUMMARY

According to a first aspect of the present disclosure, a method for antenna adjustment is provided. The method may be applied to a gateway. The gateway may determine position information of at least one terminal through at least three ultra-wide band modules. The at least one terminal may be within a network coverage range of a gateway. The gateway may include the at least three ultra-wide band modules. The gateway may adjust a lobe direction of an antenna based on the position information of the at least one terminal to achieve shaped beam coverage for each terminal.

According to a second aspect of the present disclosure, a gateway is provided. The gateway may include an antenna, a control module connected to the antenna, and at least three ultra-wide band modules connected to the control module and distributed at intervals. The at least three ultra-wide band modules may be configured to send a first positioning signal to at least one terminal, receive a second positioning signal returned by a terminal, and determine position information of the at least one terminal based on the first positioning signal and the second positioning signal. The control module may be configured to acquire the position information of the at least one terminal, generate a control instruction for adjusting a lobe direction of the antenna based on the position information of the at least one terminal, and send the control instruction to the antenna. The antenna may be configured to adjust the lobe direction of the antenna based on the control instruction.

According to a third aspect of the present disclosure, an apparatus is provided. The apparatus may include one or more processors, a non-transitory computer-readable memory storing instructions executable by the one or more processors. The one or more processors may be configured to determine position information of at least one terminal through at least three ultra-wide band modules. The at least one terminal may be within a network coverage range of a gateway. The gateway may include the at least three ultra-wide band modules. The one or more processors may also be configured to adjust a lobe direction of an antenna based on the position information of the at least one terminal to achieve shaped beam coverage for at least one terminal.

It should be understood that the above general description and the following detailed description are examples and explanatory only, and are not intended to limit the present disclosure.

BRIEF DESCRIPTION OF THE DRAWINGS

The drawings herein are incorporated in and constitute a part of the specification, illustrating examples consistent with the present disclosure, and explaining the principles of the present disclosure together with the specification.

DETAILED DESCRIPTION

Examples will be described in detail herein, examples of which are illustrated in the accompanying drawings. When the following description refers to the accompanying drawings, the same numbers in different drawings represent the same or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

Figure 1:
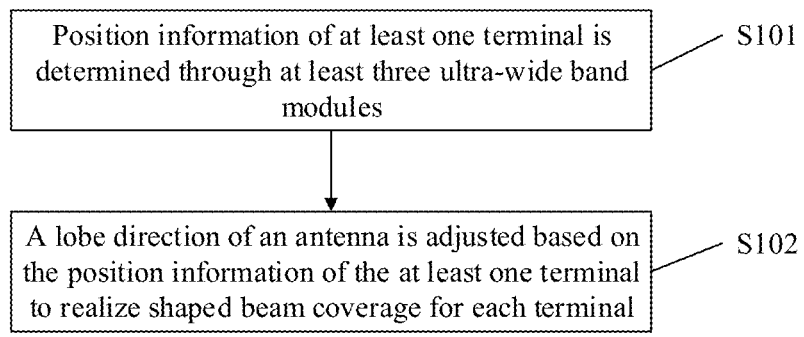
FIG. 1 is a first flowchart of an antenna adjustment method, according to an example of the present disclosure.

FIG. 1 is a first flowchart of an antenna adjustment method, according to an example. As illustrated in FIG. 1, the antenna adjustment method is applied to a gateway with at least three ultra-wide band modules. The gateway executes the antenna adjustment method, which includes the following operations.

At S101, position information of at least one terminal is determined through the at least three ultra-wide band modules; and the at least one terminal is within a network coverage range of the gateway. The ultra-wide band modules may include, for example, ultra-wide band sensors or ultra-wide band circuits.

At S102, a lobe direction of an antenna is adjusted based on the position information of the at least one terminal to realize shaped beam coverage for each terminal.

In one or more examples of the present disclosure, the above-mentioned antenna adjustment method is applied to a scenario where the gateway performs wireless cellular or wireless fidelity communication with the terminal through the antenna, and can dynamically adjust the lobe direction of the antenna to realize the shaped beam coverage for each terminal.

The gateway is an interconnection device of different networks, and may be used for either interconnection with a wide area network or interconnection with a local area network. The gateway includes a wireless access point (AP) of a base station or wireless fidelity (WiFi), which is not limited herein.

At S101, the gateway and the terminal may be in the same local area network, or may be in the same wide area network, which is not limited herein.

The ultra-wide band module can realize ranging and positioning by means of short-distance wireless communication, so that the power consumption can be reduced, and the data transmission rate can be increased.

In one or more examples of the present disclosure, the operation that position information of at least one terminal is determined through the at least three ultra-wide band modules includes: first positioning information is sent to the at least one terminal through the at least three ultra-wide band modules; second positioning information returned by the at least one terminal is received; and the position information of the at least one terminal is determined based on the first positioning information and the second positioning information.

It should be noted that the ultra-wide band module realizes wireless transmission by means of sending and receiving extremely narrow communication pulses at the level of nanosecond or microsecond or below. The first positioning information and the second positioning information may be included in the extremely narrow communication pulses.

As such, one or more examples of the present disclosure can determine the position information of the terminal directly based on the communication pulses. The communication pulses are different from a wireless cellular signal and a wireless fidelity communication signal that are required by establishment of the communication connection between the gateway and the terminal. That is, in one or more examples of the present disclosure, the gateway can measure the position information of the terminal as long as the ultra-wide band modules are powered on to work, without establishing the communication connection between the gateway and the terminal.

In one or more examples of the present disclosure, the position information of one terminal can be determined through three ultra-wide band modules. In one or more examples of the present disclosure, three ultra-wide band modules can be disposed in the gateway to determine the position information of each terminal, so that the number of ultra-wide band modules can be reduced to the maximum extent, the complexity of hardware design caused by setting of a plurality of ultra-wide band modules can be lowered, and the design can be simplified. Furthermore, the space of the gateway occupied by the ultra-wide band modules can also be decreased, and the space utilization rate of the gateway is increased.

The position information of the terminal includes three-dimensional coordinate information of the terminal or longitude and latitude information of the terminal, which is not limited herein.

At S102, the gateway has an antenna, and the antenna may guide a radio signal to one or more directions and generate a space oriented beam. The lobe of the antenna is configured to radiate a beam.

The lobe direction of the antenna may be configured to adjust a coverage range and radiation intensity of a beam radiated by the antenna. For example, the radiation intensity in a main lobe direction of the antenna is greater than the radiation intensity in a sidelobe direction of the antenna, so that the main lobe direction of the antenna is adjusted toward the terminal based on the position information of the terminal to cause the terminal to be covered by the beam and to achieve the optimal antenna resource distribution.

In one or more examples of the present disclosure, all the terminals within the network coverage range of the gateway can be covered by the beams by adjusting the lobe direction of the antenna, so that after the communication connection between the gateway and the terminal is established, the terminals can immediately acquire the optimal antenna resource distribution without waiting for the gateway to establish the communication and then adjust the lobe direction to distribute the resources. The network experience of the terminal can be optimized, and the resource adjustment time can also be saved.

In one or more examples of the present disclosure, the gateway firstly determines the position information of the at least one terminal through the at least three ultra-wide band modules, and then adjusts the lobe direction of the antenna based on the position information of the at least one terminal to realize the shaped beam coverage for each terminal. That is, on one hand, the examples of the present disclosure determine the position of the terminal directly based on the ultra-wide band modules, do not need a complicated algorithm for calculation, and have no harsh algorithm prerequisites, so that the calculation process for the lobe direction of the antenna can be simplified, and the adjustment efficiency is improved; and the prerequisites do not need to be considered, so that the adjustment for the antenna is general.

On the other hand, compared with establishing communication connection between the gateway and the terminal before adjusting the lobe direction of the antenna, the examples of the present disclosure have the advantages that the position information of the terminal can be measured immediately as long as the ultra-wide band modules are powered on to work, so that the lobe direction of the antenna can be adjusted to realize the shaped beam coverage for each terminal, and the gateway does not need to establish the communication connection with the terminal in advance, so that in one or more examples of the present disclosure, the terminal can immediately acquire optimal antenna resource distribution after the gateway establishes the communication connection with the terminal, without waiting for the gateway to establish the communication connection and then adjust the lobe direction to distribute resources. The network experience of the terminal can be optimized, and the resource adjustment time can be saved.

Figure 2:
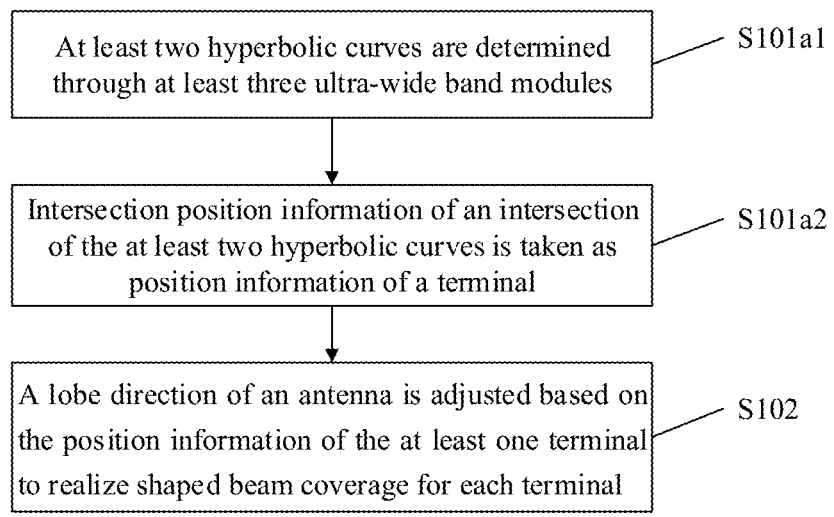
FIG. 2 is a second flowchart of an antenna adjustment method, according to an example of the present disclosure.

In some examples, as illustrated in FIG. 2, the operation that the position information of at least one terminal is determined through the at least three ultra-wide band modules at S101 includes the following operations.

At S101a1, at least two hyperbolic curves are determined through the at least three ultra-wide band modules.

At S101a2, intersection position information of an intersection of the at least two hyperbolic curves is taken as the position information of the terminal.

At S101a1, the above-mentioned at least three ultra-wide band modules are distributed at different positions of the gateway at intervals. The number of the ultra-wide band modules is positively correlated with the number of the determined hyperbolic curves. If the number of the ultra-wide band modules is larger, the number of the determined hyperbolic curves is larger.

Figure 3:
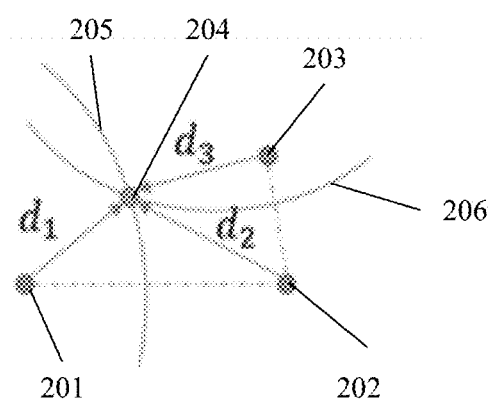
FIG. 3 is a schematic diagram of a hyperbolic curve, according to an example of the present disclosure.

It should be noted that two ultra-wide band modules can determine one hyperbolic curve. As illustrated in FIG. 3, the at least three ultra-wide band modules includes a first ultra-wide band module 201, a second ultra-wide band module 202 and a third ultra-wide band module 203. The at least two hyperbolic curves include a first hyperbolic curve 205 and a second hyperbolic curve 206. In some examples, the operation that at least two hyperbolic curves are determined through the at least three ultra-wide band modules includes as follows.

A first distance difference between a distance from the first ultra-wide band module 201 to the terminal 204 and a distance from the second ultra-wide band module 202 to the terminal 204 is determined.

A second distance difference between the distance from the second ultra-wide band module 202 to the terminal 204 and a distance from the third ultra-wide band module 203 to the terminal 204 is determined.

The first hyperbolic curve 205 is formed based on that a distance difference between the distance to the first ultra-wide band module 201 and the distance to the second ultra-wide band module 202 is a trajectory of the first distance difference.

The second hyperbolic curve 206 is formed based on that a distance difference between the distance to the second ultra-wide band module 202 and the distance to the third ultra-wide band module 203 is a trajectory of the second distance difference. In one or more examples of the present disclosure, the terminal also includes an ultra-wide band module. The first distance difference and the second distance difference can be determined by means of the positioning communication among the ultra-wide band module of the terminal, the first ultra-wide band module, the second ultra-wide band module and the third ultra-wide band module.

The above-mentioned determining the first distance difference includes: first time and second time that a first signal is respectively from the first ultra-wide band module and the second ultra-wide band module to the terminal are acquired. A first distance is acquired based on the first time. A second distance is acquired based on the second time. The first distance difference is determined based on a difference value between the first distance and the second distance.

For example, as illustrated in FIG. 3, the first distance is d1, the second distance is d2, and the first distance difference is $\|d1-d2\|$.

The above-mentioned determining the second distance difference includes: third time and fourth time that a first signal is respectively from the second ultra-wide band module and the third ultra-wide band module to the terminal are acquired. A third distance is acquired based on the third time. A fourth distance is acquired based on the fourth time. The second distance difference is determined based on a difference value between the third distance and the fourth distance.

For example, as illustrated in FIG. 3, the third distance is d2, the fourth distance is d3, and the second distance difference is $\|d2-d3\|$.

In one or more examples of the present disclosure, the first ultra-wide band module and the second ultra-wide band module may be two focal points of the first hyperbolic curve, and the first distance difference may be twice a real semi-axis of the first hyperbolic curve.

The second ultra-wide band module and the third ultra-wide band module may be two focal points of the second hyperbolic curve. The second distance difference may be twice a real semi-axis of the second hyperbolic curve.

At S101a2, the position of the terminal on a plane is on the first hyperbolic curve and the second hyperbolic curve, so that the intersection position information of the intersection between the first hyperbolic curve and the second hyperbolic curve can be used as the position information of the terminal, and the position information of the terminal may be measured through the ultra-wide band modules.

In one or more examples of the present disclosure, the gateway may form two hyperbolic curves through the three ultra-wide band modules to measure the position information of the terminal.

Figure 4:
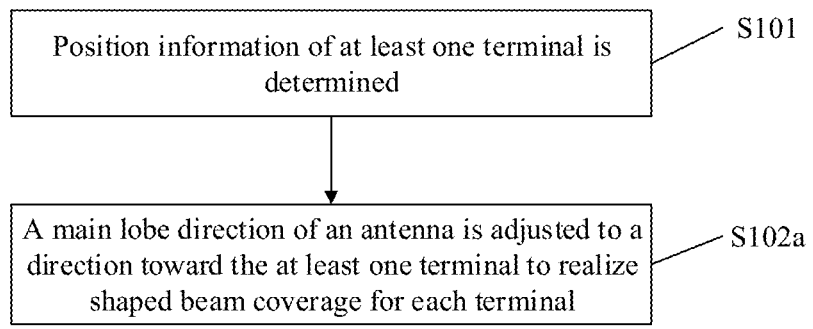
FIG. 4 is a third flowchart of an antenna adjustment method, according to an example of the present disclosure.

In some examples, as illustrated in FIG. 4, a lobe of the antenna includes a main lobe of the antenna; and the operation that the lobe direction of the antenna is adjusted based on the position information of the at least one terminal at S102 includes the following operations.

At S102a, a main lobe direction of the antenna is adjusted to a direction toward the at least one terminal.

The lobe of the antenna includes a main lobe of the antenna and a sidelobe of the antenna. The main lobe of the antenna is a lobe that has strongest antenna radiation, and a lobe of the antenna besides the main lobe is the sidelobe.

In one or more examples of the present disclosure, the antenna may include one or more main lobes. The quantity of the main lobe may be set according to the quantity of the terminal. For example, the quantity of the main lobe may be set to be greater than or equal to the quantity of the terminal, which is not limited herein.

The main lobe direction of the antenna is adjusted to the direction toward the at least one terminal. As such, the main lobe of the antenna may be aligned with the at least one terminal to realize that a plurality of terminals can be at optimal positions in the antenna covered by a communication network to cause the terminals to obtain the best network resource distribution.

In some examples, a lobe of the antenna includes a sidelobe of the antenna. The method further includes: a sidelobe direction of the antenna is adjusted to directions other than a direction toward the at least one terminal.

The operation that the sidelobe direction of the antenna is adjusted to directions other than the direction toward the at least one terminal includes: when a plurality of terminals are provided, the sidelobe direction of the antenna may be adjusted to a direction between two adjacent terminals.

In one or more examples of the present disclosure, the sidelobe direction of the antenna is adjusted to directions other than the direction toward the at least one terminal. That is, the sidelobe direction of the antenna is not toward the terminal. As such, the terminal can be at the optimal position in the antenna covered by the communication network to the maximum extent.

Figure 5:
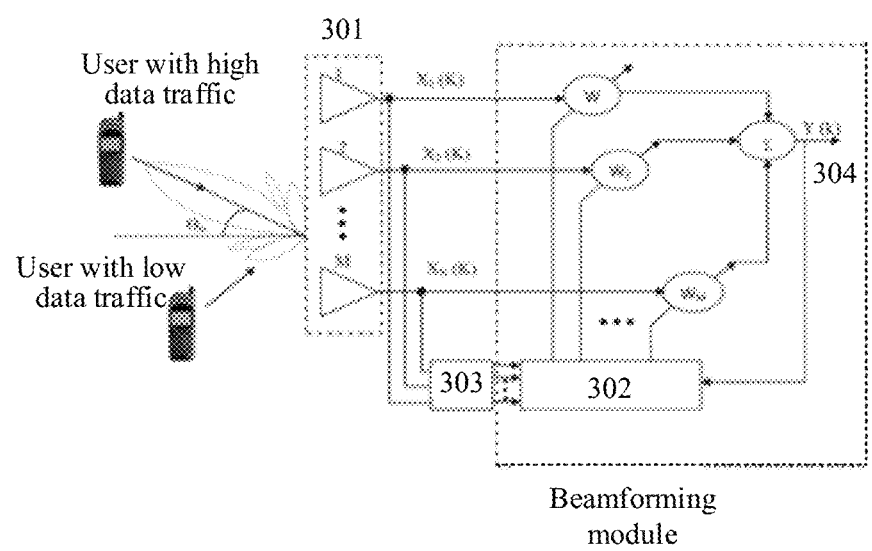
FIG. 5 is a schematic diagram of antenna beamforming, according to an example of the present disclosure.

For example, as illustrated in FIG. 5, reference number 301 indicates an antenna array, reference number 302 indicates an adaptive signal processor, reference number 303 indicates a direction of arrival of an incident signal incoming wave, and reference number 304 indicates an array output. The antenna forms a directed beam through a beamforming module, so that the main lobe in an antenna radiation pattern points to a user with high data traffic, and the sidelobe or nulling of the antenna radiation pattern points to a user with low data traffic. That is, the existing implementation is to perform real-time adjustment according to a spatial distribution of traffic users to achieve distribution of dynamically optimized resources.

Correspondingly, based on the position information of the terminal, one or more examples of the present disclosure adjust the main lobe direction of the antenna to the direction toward the at least one terminal and adjust the sidelobe direction of the antenna to directions other than the direction toward the at least one terminal. As such, one or more examples of the present disclosure can adjust the lobe direction of the antenna directly based on the position information of the terminal, without establishing a communication to determine a direction of a traffic user, so that the terminal can distribute and obtain high-quality network resources after establishing the communication connection with the gateway, and the network experience of the terminal can be optimized.

In some examples, the operations that a main lobe direction of the antenna is adjusted to a direction toward the at least one terminal includes: when a plurality of terminals are provided, a plurality of main lobe directions of the antenna are adjusted to directions toward each terminal respectively. Each terminal corresponds to one main lobe.

In one or more examples of the present disclosure, the number of the main lobe of the antenna may be set according to the number of the terminal. For example, the number of the main lobe of the antenna may be set to be greater than or equal to the number of the terminal. As such, each terminal can correspond to one main lobe, so that the terminal is at the optimal position covered by a communication network antenna in real time.

Figure 6:
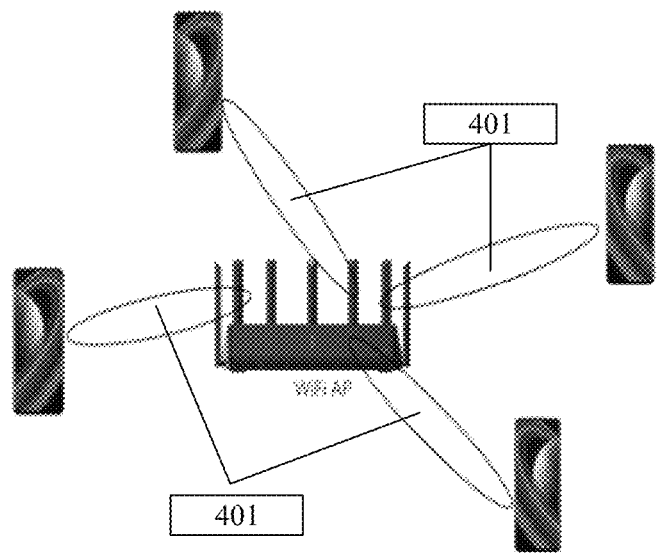
FIG. 6 is a schematic diagram illustrating that a lobe of a gateway faces a terminal, according to an example of the present disclosure.

For example, as illustrated in FIG. 6, the gateway is a WiFi AP. There are four terminals in a network coverage range of the gateway. In the antenna shaping process, the lobe of the antenna is divided into four main lobes 401, so that each main lobe 401 can face one terminal, and all the terminals are at the optimal positions covered by the communication network antenna in real time. After the communication connection with the terminal is established, the high-quality network resources can be distributed and obtained, and the network experience of the terminal can be optimized.

One or more examples of the present disclosure further provide a gateway. The gateway includes an antenna, a control module connected to the antenna, and at least three ultra-wide band modules connected to the control module and distributed at intervals. The control module may include, for example, a control circuit.

The at least three ultra-wide band modules are configured to send a first positioning signal to at least one terminal, receive a second positioning signal returned by the terminal, and determine position information of the at least one terminal based on the first positioning signal and the second positioning signal. The control module is configured to acquire the position information of the at least one terminal, generate a control instruction for adjusting a lobe direction of the antenna based on the position information of the at least one terminal, and send the control instruction to the antenna. The antenna is configured to adjust the lobe direction of the antenna based on the control instruction.

In one or more examples of the present disclosure, the gateway firstly determines the position information of the at least one terminal through the at least three ultra-wide band modules, and then adjusts the lobe direction of the antenna based on the position information of the at least one terminal to realize the shaped beam coverage for each terminal. That is, on one hand, one or more examples of the present disclosure determine the position of the terminal directly based on the ultra-wide band modules, do not need a complicated algorithm for calculation, and have no harsh algorithm prerequisites, so that the calculation process for the lobe direction of the antenna can be simplified, and the adjustment efficiency is improved; and the prerequisites do not need to be considered, so that the adjustment for the antenna is general.

On the other hand, compared with establishing communication connection between the gateway and the terminal before adjusting the lobe direction of the antenna, one or more examples of the present disclosure have the advantages that the position information of the terminal can be measured immediately as long as the ultra-wide band modules are powered on to work to realize the shaped beam coverage for each terminal, and the gateway does not need to establish the communication connection with the terminal in advance, so that in one or more examples of the present disclosure, the terminal can immediately acquire optimal antenna resource distribution after the gateway establishes the communication connection with the terminal, without waiting for the gateway to establish the communication connection and then adjust the lobe direction to distribute resources. The network experience of the terminal can be optimized, and the resource adjustment time can be saved.

In some examples, the at least three ultra-wide band modules are distributed on the gateway at equal intervals.

The ultra-wide band modules of the examples of the present disclosure are distributed on the gateway at equal intervals, so that the gateway can measure the position information of the terminal faster.

One or more examples of the present disclosure further provide a terminal. The terminal includes: at least one ultra-wide band module on the terminal, configured to receive a first positioning signal sent by a gateway and send a second positioning signal to the gateway based on the first positioning signal.

By means of the ultra-wide band modules of the terminal and the gateway in one or more examples of the present disclosure, the gateway may measure the position information of the terminal without establishing a communication connection with the terminal.

One or more examples of the present disclosure further provide an adjustment system. The adjustment system includes a gateway and a terminal.

The gateway is configured to send a first positioning signal to the terminal. The terminal is configured to return a second positioning signal to the gateway based on the first positioning signal. The gateway is configured to determine position information of at least one terminal based on the first positioning signal and the second positioning signal, and adjust a lobe direction of an antenna in the gateway based on the position information of the at least one terminal to realize shaped beam coverage for each terminal.

By means of the communication between the gateway and the terminal in the adjustment system, one or more examples of the present disclosure can cause the gateway to measure the position information of the terminal without establishing a communication connection with the terminal. On one hand, one or more examples of the present disclosure determine the position of the terminal directly based on the ultra-wide band modules, do not need a complicated algorithm for calculation, and have no harsh algorithm prerequisites, so that the calculation process for the lobe direction of the antenna can be simplified, and the adjustment efficiency is improved; and the prerequisites do not need to be considered, so that the adjustment for the antenna is general.

On the other hand, compared with establishing communication connection between the gateway and the terminal before adjusting the lobe direction of the antenna, one or more examples of the present disclosure have the advantages that the position information of the terminal can be measured immediately as long as the ultra-wide band modules are powered on to work to realize the shaped beam coverage for each terminal, and the gateway does not need to establish the communication connection with the terminal in advance, so that in one or more examples of the present disclosure, the terminal can immediately acquire optimal antenna resource distribution after the gateway establishes the communication connection with the terminal, without waiting for the gateway to establish the communication connection and then adjust the lobe direction to distribute resources. The network experience of the terminal can be optimized, and the resource adjustment time can be saved.

Figure 7:
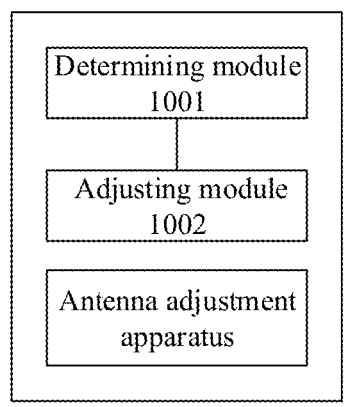
FIG. 7 is a diagram of an antenna adjustment apparatus, according to an example of the present disclosure.

FIG. 7 is a diagram of an antenna adjustment apparatus, according to an example. Referring to FIG. 7, the antenna adjustment apparatus includes a determining module 1001 and an adjusting module 1002.

The determining module 1001 is configured to determine position information of at least one terminal through at least three ultra-wide band modules. The at least one terminal is within a network coverage range of a gateway.

The adjusting module 1002 is configured to adjust a lobe direction of an antenna based on the position information of the at least one terminal to achieve shaped beam coverage for each terminal.

In some examples, the determining module includes: a curve determining module configured to determine at least two hyperbolic curves through the at least three ultra-wide band modules; and a position determining module configured to take intersection position information of an intersection of the at least two hyperbolic curves as the position information of the terminal.

In some examples, the at least three ultra-wide band modules include a first ultra-wide band module, a second ultra-wide band module, and a third ultra-wide band module.

The at least two hyperbolic curves include a first hyperbolic curve and a second hyperbolic curve.

The curve determining module is further configured to determine a first distance difference between a distance from the first ultra-wide band module to the terminal and a distance from the second ultra-wide band module to the terminal; determine a second distance difference between the distance from the second ultra-wide band module to the terminal and a distance from the third ultra-wide band module to the terminal; form the first hyperbolic curve based on that a distance difference between the distance to the first ultra-wide band module and the distance to the second ultra-wide band module is a trajectory of the first distance difference; and form the second hyperbolic curve based on that a distance difference between the distance to the second ultra-wide band module and the distance to the third ultra-wide band module is a trajectory of the second distance difference.

In some examples, a lobe of an antenna includes a main lobe of the antenna. The adjusting module includes: a main lobe adjusting module configured to adjust a main lobe direction of the antenna to a direction toward the at least one terminal.

In some examples, the main lobe adjusting module is further configured to, when a plurality of terminals are provided, respectively adjust a plurality of main lobe directions of the antenna to directions toward each terminal, and each terminal corresponds to one main lobe.

In some examples, a lobe of the antenna includes a sidelobe of the antenna. The apparatus further includes: a sidelobe adjusting module configured to adjust a sidelobe direction of the antenna to directions other than a direction toward the at least one terminal.

As for the apparatus in the above example, a specific method used by each module to execute operations has been described in detail in the example of the method, and will not be repeated here.

Figure 8:
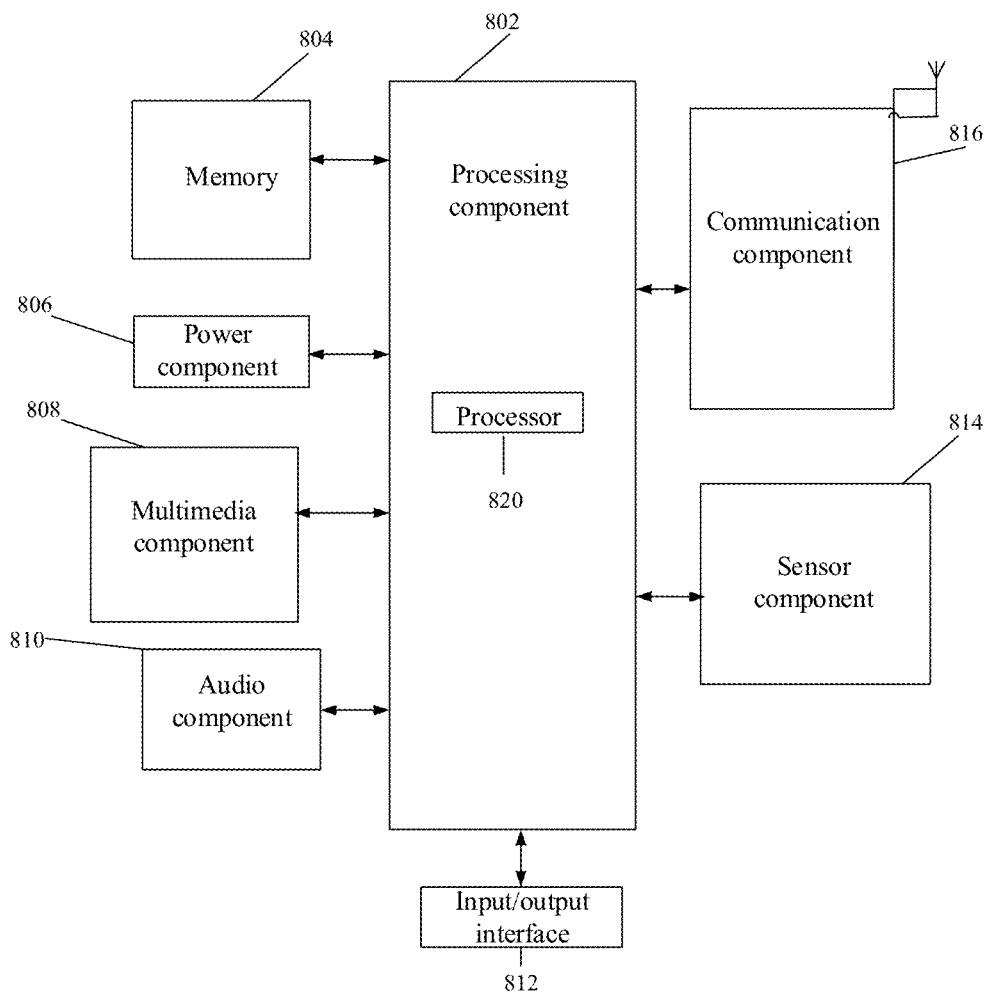
FIG. 8 is a block diagram of a terminal, according to an example of the present disclosure.

FIG. 8 is a block diagram of a terminal, according to an example. For example, the terminal may be a mobile phone, a mobile computer, and the like.

Referring to FIG. 8, the terminal may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the terminal, such as the operations associated with display, telephone calls, data communications, camera operations, and recording operations. The processing component 802 may include one or more processors 820 to execute instructions to perform all or part of the steps in the abovementioned method. In addition, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support the operation of the device. Examples of such data include instructions for any applications or methods operated on the terminal, contact data, phonebook data, messages, pictures, video, and the like. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the terminal. The power component 806 may include a power management system, one or more power supplies, and other components associated with generation, management and distribution of power for the terminal.

The multimedia component 808 includes a screen providing an output interface between the terminal and a user. In some examples, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some examples, the multimedia component 808 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the terminal is in an operation mode, such as a call mode, a recording mode and a voice recognition mode. The received audio signal may further be stored in the memory 804 or sent via the communication component 816. In some examples, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button and a locking button.

The sensor component 814 includes one or more sensors configured to provide status assessments in various aspects for the terminal. For example, the sensor component 814 may detect an on/off status of the device and relative positioning of components, such as a display and small keyboard of the terminal, and the sensor component 814 may further detect a change in a position of the terminal or a component of the terminal, presence or absence of contact between the user and the terminal, orientation or acceleration/deceleration of the terminal, and a change in temperature of the terminal. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the terminal and other devices. The terminal may access a communication-standard-based wireless network, such as a wireless fidelity (WiFi) network, a 2nd-generation (2G) or 3rd-generation (3G) network or a combination thereof. In one or more examples, the communication component 816 receives a broadcast signal or broadcast associated information from an external broadcast management system via a broadcast channel. In one or more examples, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In one or more examples, the terminal may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above method.

In one or more examples, there is also provided a non-transitory computer-readable storage medium including instructions, such as included in the memory 804, executable by the processor 820 of the terminal for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

Other implementations of the present disclosure will be apparent to those skilled in the art from consideration of the specification and practice of the present disclosure herein. The present application is intended to cover any variations, uses, or adaptations of the present disclosure that follow the general principles thereof and include common knowledge or conventional techniques in the technical field that are not disclosed. The specification and the examples are considered as being examples only, with a true scope and spirit of the present disclosure being indicated by the following claims.

It will be appreciated that the present disclosure is not limited to the exact structure that has been described above and illustrated in the accompanying drawings, and that various modifications and changes may be made without departing from the scope thereof. The scope of the present disclosure is limited only by the appended claims.

What is claimed is:

1. A method for antenna adjustment, comprising:
   determining, by a gateway comprising at least three ultra-wide band modules, position information of at least one terminal through the at least three ultra-wide band modules, wherein the at least one terminal is within a network coverage range of the gateway; and
   adjusting, by the gateway, a lobe direction of an antenna based on the position information of the at least one terminal to achieve shaped beam coverage for each terminal,
   wherein determining the position information of the at least one terminal through the at least three ultra-wide band modules comprises:
   determining, by the gateway, at least two hyperbolic curves through the at least three ultra-wide band modules; and
   taking, by the gateway, intersection position information of an intersection of the at least two hyperbolic curves as the position information of the terminal,
   wherein determining the at least two hyperbolic curves through the at least three ultra-wide band modules comprises:
   determining a first distance difference between a distance from a first ultra-wide band module to the terminal and a distance from a second ultra-wide band module to the terminal, wherein the at least three ultra-wide band modules comprise the first ultra-wide band module, the second ultra-wide band module, and a third ultra-wide band module, wherein the at least two hyperbolic curves comprise a first hyperbolic curve and a second hyperbolic curve;
   determining a second distance difference between the distance from the second ultra-wide band module to the terminal and a distance from the third ultra-wide band module to the terminal;
   forming the first hyperbolic curve based on that a distance difference between the distance to the first ultra-wide band module and the distance to the second ultra-wide band module is a trajectory of the first distance difference; and forming the second hyperbolic curve based on that a distance difference between the distance to the second ultra-wide band module and the distance to the third ultra-wide band module is a trajectory of the second distance difference.

2. The method of claim 1, wherein adjusting the lobe direction of the antenna based on the position information of the at least one terminal comprises:
adjusting a main lobe direction of the antenna to a direction toward the at least one terminal, wherein a lobe of the antenna comprises a main lobe of the antenna.

3. The method of claim 2, wherein adjusting the main lobe direction of the antenna to the direction toward the at least one terminal comprises:
adjusting, when a plurality of terminals are provided, a plurality of main lobe directions of the antenna to directions toward each terminal respectively;
wherein each terminal corresponds to one main lobe.

4. The method of claim 1, further comprising:
adjusting a sidelobe direction of the antenna to directions other than a direction toward the at least one terminal, wherein a lobe of the antenna comprises a sidelobe of the antenna.

5. The method of claim 1, wherein the terminal comprises an ultra-wide band module;
wherein the first distance difference and the second distance difference are determined by positioning communication among the ultra-wide band module of the terminal, the first ultra-wide band module, the second ultra-wide band module and the third ultra-wide band module.

6. The method of claim 5, wherein determining the first distance difference comprises:
acquiring first time and second time that a first signal is respectively from the first ultra-wide band module and the second ultra-wide band module to the terminal;
acquiring a first distance based on the first time;
acquiring a second distance based on the second time; and
determining the first distance difference based on a difference value between the first distance and the second distance.

7. The method of claim 5, wherein determining the second distance difference comprises:
acquiring third time and fourth time that a first signal is respectively from the second ultra-wide band module and the third ultra-wide band module to the terminal;
acquiring a third distance based on the third time;
acquiring a fourth distance based on the fourth time; and
determining the second distance difference based on a difference value between the third distance and the fourth distance.

8. A gateway, comprising:
an antenna,
a control module connected to the antenna, and
at least three ultra-wide band modules connected to the control module and distributed at intervals;
wherein the at least three ultra-wide band modules are configured to send a first positioning signal to at least one terminal, receive a second positioning signal returned by a terminal, and determine position information of the at least one terminal based on the first positioning signal and the second positioning signal;
wherein the control module is configured to acquire the position information of the at least one terminal, generate a control instruction for adjusting a lobe direction of the antenna based on the position information of the at least one terminal, and send the control instruction to the antenna; and
wherein the antenna is configured to adjust the lobe direction of the antenna based on the control instruction.

9. The gateway of claim 8, wherein the at least three ultra-wide band modules are distributed on the gateway at equal intervals.

10. An apparatus, comprising:
one or more processors; and
a non-transitory computer-readable storage medium storing instructions executable by the one or more processors;
wherein the one or more processors are configured to:
determine position information of at least one terminal through at least three ultra-wide band modules, wherein the at least one terminal is within a network coverage range of a gateway, wherein the gateway comprises the at least three ultra-wide band modules; and
adjust a lobe direction of an antenna based on the position information of the at least one terminal to achieve shaped beam coverage for each terminal,
wherein the one or more processors are further configured to:
determine at least two hyperbolic curves through the at least three ultra-wide band modules; and
take intersection position information of an intersection of the at least two hyperbolic curves as the position information of the terminal,
wherein the one or more processors are further configured to:
determine a first distance difference between a distance from a first ultra-wide band module to the terminal and a distance from a second ultra-wide band module to the terminal, wherein the at least three ultra-wide band modules comprise the first ultra-wide band module, the second ultra-wide band module, and a third ultra-wide band module, wherein the at least two hyperbolic curves comprise a first hyperbolic curve and a second hyperbolic curve;
determine a second distance difference between the distance from the second ultra-wide band module to the terminal and a distance from the third ultra-wide band module to the terminal;
form the first hyperbolic curve based on that a distance difference between the distance to the first ultra-wide band module and the distance to the second ultra-wide band module is a trajectory of the first distance difference; and
form the second hyperbolic curve based on that a distance difference between the distance to the second ultra-wide band module and the distance to the third ultra-wide band module is a trajectory of the second distance difference.

11. The apparatus of claim 10, wherein the one or more processors are further configured to:
adjust a main lobe direction of the antenna to a direction toward the at least one terminal, wherein a lobe of the antenna comprises a main lobe of the antenna.

12. The apparatus of claim 11, wherein the one or more processors are further configured to, when a plurality of terminals are provided, respectively adjust a plurality of main lobe directions of the antenna to directions toward each terminal;
wherein each terminal corresponds to one main lobe.

13. The apparatus of claim 10, wherein the one or more processors are further configured to:

adjust a sidelobe direction of the antenna to directions other than a direction toward the at least one terminal, wherein a lobe of the antenna comprises a sidelobe of the antenna.

14. A non-transitory computer-readable storage medium, storing computer executable instructions; the computer executable instructions, when executed by one or more processors, implement the method of claim 1.

* * * * *